(12) United States Patent
Seo (10) Patent No.: US 8,743,110 B2
(45) Date of Patent: Jun. 3, 2014

(54) METHOD AND APPARATUS FOR CREATING OF 3D DIRECTION DISPLAYING

(75) Inventor: Jung Kak Seo, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 232 days.

(21) Appl. No.: 12/989,896

(22) PCT Filed: Jun. 30, 2008

(86) PCT No.: PCT/KR2008/003808
§ 371 (c)(1),
(2), (4) Date: Oct. 27, 2010

(87) PCT Pub. No.: WO2009/133988
PCT Pub. Date: Nov. 5, 2009

(65) Prior Publication Data
US 2011/0050689 A1    Mar. 3, 2011

(30) Foreign Application Priority Data
Apr. 30, 2008  (KR) .................. 10-2008-0040886

(51) Int. Cl.
*G06T 15/00* (2011.01)

(52) U.S. Cl.
USPC ........................................... 345/419

(58) Field of Classification Search
CPC .... G01C 21/3638; G06T 17/05; G06T 19/00; G06T 19/003; G06T 15/10; G06T 17/00; G06T 15/00
See application file for complete search history.

(56) References Cited

U.S. PATENT DOCUMENTS

| 5,748,109 | A | 5/1998 | Kosaka et al. |
| 6,374,183 | B1 | 4/2002 | Oshida et al. |
| 7,454,715 | B2 * | 11/2008 | Chen et al. ................... 715/850 |
| 7,920,966 | B2 * | 4/2011 | Emoto et al. ................. 701/436 |
| 2002/0070981 | A1 | 6/2002 | Kida |
| 2007/0172147 | A1 | 7/2007 | Fujiwara et al. |

FOREIGN PATENT DOCUMENTS

| EP | 1435507 A2 | 7/2004 |
| EP | 1584897 A2 | 10/2005 |
| KR | 10-2003-0050765 A | 6/2003 |
| KR | 10-2007-0098103 A | 10/2007 |

OTHER PUBLICATIONS

Infosthetics (http://infosthetics.com/archives/2006/08/need_for_speed_physical_game_icons.html).*
Supplementary European Search Report dated Dec. 21, 2012 in European Application No. 08778473.2, filed Jun. 30, 2008.

* cited by examiner

*Primary Examiner* — Kee M Tung
*Assistant Examiner* — Frank Chen
(74) *Attorney, Agent, or Firm* — Fox Rothschild, LLP

(57) ABSTRACT

An apparatus and method for generating a three-dimensional (3D) path are provided. The apparatus includes: a polygon generation unit to generate a left polygon and a right polygon on the left and the right of path data, respectively, based on a linear interpolation point of the path data; and a polygon conversion unit to apply a height value to the linear interpolation point based on the left polygon and the right polygon and to thereby generate the 3D path.

10 Claims, 8 Drawing Sheets

METHOD AND APPARATUS FOR CREATING OF 3D DIRECTION DISPLAYING

CROSS-REFERENCE TO RELATED APPLICATIONS

This application is the U.S. national stage application of International Patent Application No. PCT/KR2008/003808, filed Jun. 30, 2008, which claims priority to Korean Application No. 10-2008-0040886, filed Apr. 30, 2008, the disclosures of each of which are incorporated herein by reference in their entirety.

TECHNICAL FIELD

The present invention relates to a method and apparatus for generating a three-dimensional (3D) direction display.

BACKGROUND ART

Along with the development of location tracking technologies, a path display map that may generate and display a path from a current location to a destination is commercialized. In general, the path display map may verify a location of a path display terminal using a Global Positioning System (GPS), retrieve map information from the location of the path display terminal to a destination, and generate and display an optimal path.

The conventional path display map two-dimensionally displays buildings around a road corresponding to the map information and thus may not display a characteristic appearance of the buildings.

In order to overcome the above limit, there is provided a method that may display a path of the path display map using a three-dimensional (3D) map. However, in this case, when a path needs a left turn or a right turn of a vehicle, a road that is provided on a left side or a road that is provided on a right side may be occluded by buildings. Accordingly, it may be difficult to recognize that the path needs the left turn or the right turn.

When using a 2D image symbol to be used for indicating a turn area in the conventional path display map, a perspective scheme may be applied. Due to a characteristic of a 3D map where an image size becomes smaller as a distance becomes more distant, only when the path is sufficiently close to the turn area, the 2D image symbol may be displayed in a recognizable size. Accordingly, there is a need for a direction indication method that may easily recognize a turn section from a long distance.

DISCLOSURE OF INVENTION

Technical Goals

An aspect of the present invention provides a method and apparatus for generating a three-dimensional (3D) direction display that may generate a direction display corresponding to path information and thereby may generate a 3D direction display matching a path direction.

Another aspect of the present invention also provides a method and apparatus for generating a 3D direction display that may display a 3D direction display on a 3D map according to a heading direction and an angle and thereby may recognize a direction of a path, even when the path is occluded by buildings around a road.

Another aspect of the present invention also provides a method and apparatus for generating a 3D direction display that may display a 3D direction display using a different color or an animation effect according to an angle of a path, and thereby may obtain information regarding at which angle the path is refracted.

Technical Solutions

According to an aspect of the present invention, there is provided an apparatus for generating a three-dimensional (3D) direction display, the apparatus including: a path generation unit to generate path data on a 3D map using a path line algorithm; and a direction display generation unit to generate the 3D direction display so that the same curve as a curve of the path data is formed.

In this instance, the direction display generation unit may further include a direction display starting point search unit to set a direction display starting point from the path data. The direction display generation unit may generate the 3D direction display based on a distance from the direction display starting point to each of linear interpolation points constituting the path data.

Also, the direction display starting point search unit may set a predetermined linear interpolation point as the direction display starting point according to an angle difference between a heading direction vector of a vehicle and a direction vector of each of the linear interpolation points.

Also, the direction display generation unit may generate the additional interpolation point using a sum of distances between linear interpolation points starting from the direction display starting point, and a horizontal length of the 3D direction display on a predetermined screen.

When a sum of distances between linear interpolation points starting from the additional interpolation point is greater than the horizontal length of the 3D direction display, the direction display generation unit may generate another additional interpolation point using a distance difference between the sum of distances, between the linear interpolation points starting from the additional interpolation point, and the horizontal length of the 3D direction display.

Also, the 3D direction display generation apparatus may further include: a direction display movement unit to move the 3D direction display towards a direction vector direction between a location of a vehicle and the direction display starting point.

According to another aspect of the present invention, there is provided a method of generating a 3D direction display, the method including: generating path data on a 3D map using a path line algorithm; and generating the 3D direction display so that the same curve as a curve of the path data is formed.

Advantageous Effect

According to embodiments of the present invention, it is possible to generate a direction display corresponding to path information and thereby generate a three-dimensional (3D) direction display matching a path direction.

Also, according to embodiments of the present invention, it is possible to display a 3D direction display on a 3D map according to a heading direction and an angle and thereby recognize a direction of a path, even when the path is occluded by buildings around a road.

Also, according to embodiments of the present invention, it is possible to display a 3D direction display using a different color or an animation effect according to an angle of a path and thereby obtain information regarding at which angle the path is refracted.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
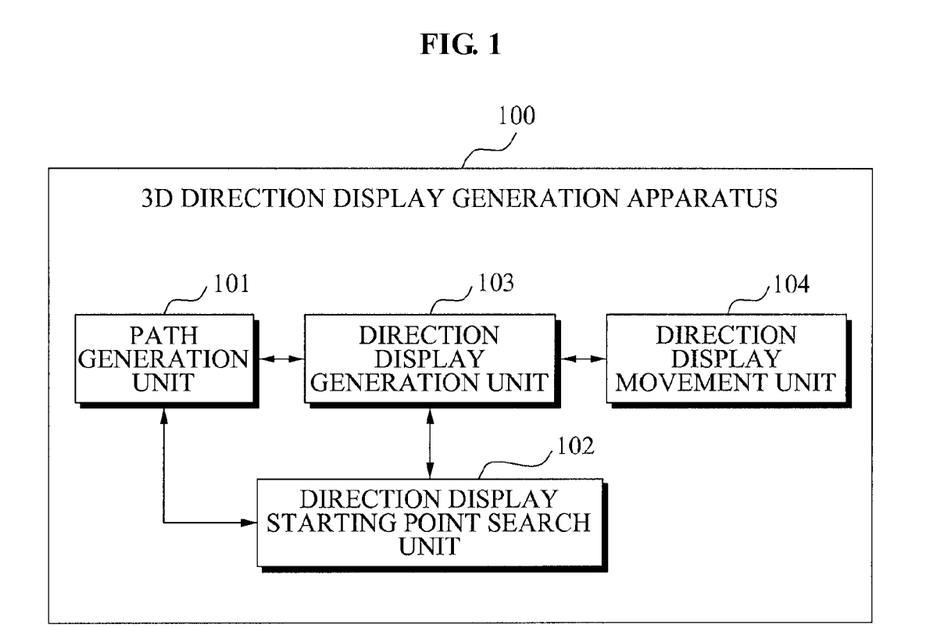
FIG. 1 is a block diagram illustrating a configuration of an apparatus for generating a three-dimensional (3D) direction display according to an embodiment of the present invention.

FIG. 1 is a block diagram illustrating a configuration of an apparatus 100 for generating a three-dimensional (3D) direction display according to an embodiment of the present invention.

A path generation unit 101 may provide path data of a path to a direction display starting point search unit 102 and a direction display generation unit 103. The direction display starting point search unit 102 may search the path data for a direction display starting point. The direction display generation unit 103 may generate an additional interpolation point between interpolation points of the path data, and may generate the 3D direction display using the direction display starting point and the additional interpolation point.

The path generation unit 101 may generate a 3D map by texture-mapping map data between a current location of a vehicle and a destination. The path generation unit 101 may generate a path from the current location of the vehicle to the destination on the 3D map, using a path line algorithm.

Here, the term "linear interpolation point" denotes a point where a curve occurs in the path. A single linear interpolation point may express only a path that is curved at a predetermined angle. Accordingly, although distances of sections are the same, a relatively large number of linear interpolation points may be included in a section with a serious curve such as a turn section. A relatively small number of linear interpolation points may be included in a linear section with a small curve.

The direction display starting point search unit 102 may obtain a first direction vector from the current location of the vehicle and a guide point, and may also obtain a second direction vector from the guide point and the linear interpolation point. When an angle difference between the first direction vector and the second direction vector is greater than a reference angle, the direction display starting point search unit 102 may determine the linear interpolation point as the direction display starting point.

When a sum of distances between linear interpolation points starting from the direction display starting point is greater than a size of the 3D direction display, the direction display generation unit 103 may generate the additional interpolation point using a distance difference between the sum of distances and the size of the 3D direction display.

When a sum of distances between linear interpolation points starting from the additional interpolation point is greater than the size of the 3D direction display, the direction display generation unit 103 may further generate another additional interpolation point using a distance difference between the sum of distances and the size of the 3D direction display.

The direction display generation unit 103 may generate, using a different color, the 3D direction display in correspondence to a number of linear interpolation points that are included between the direction display starting point and the additional interpolation point, or between a plurality of additional interpolation points, when the plurality of additional interpolation points are generated.

Also, the direction display generation unit 103 may generate the 3D direction display to have the same direction vector as a direction vector of the path data.

Also, the direction display generation unit 103 may generate the 3D direction display at a height greater than a height of the path generated by the path generation unit 103.

A direction display movement unit 104 may move the 3D direction display towards a direction vector direction between a location of the vehicle and the direction display starting point.

Figure 2:
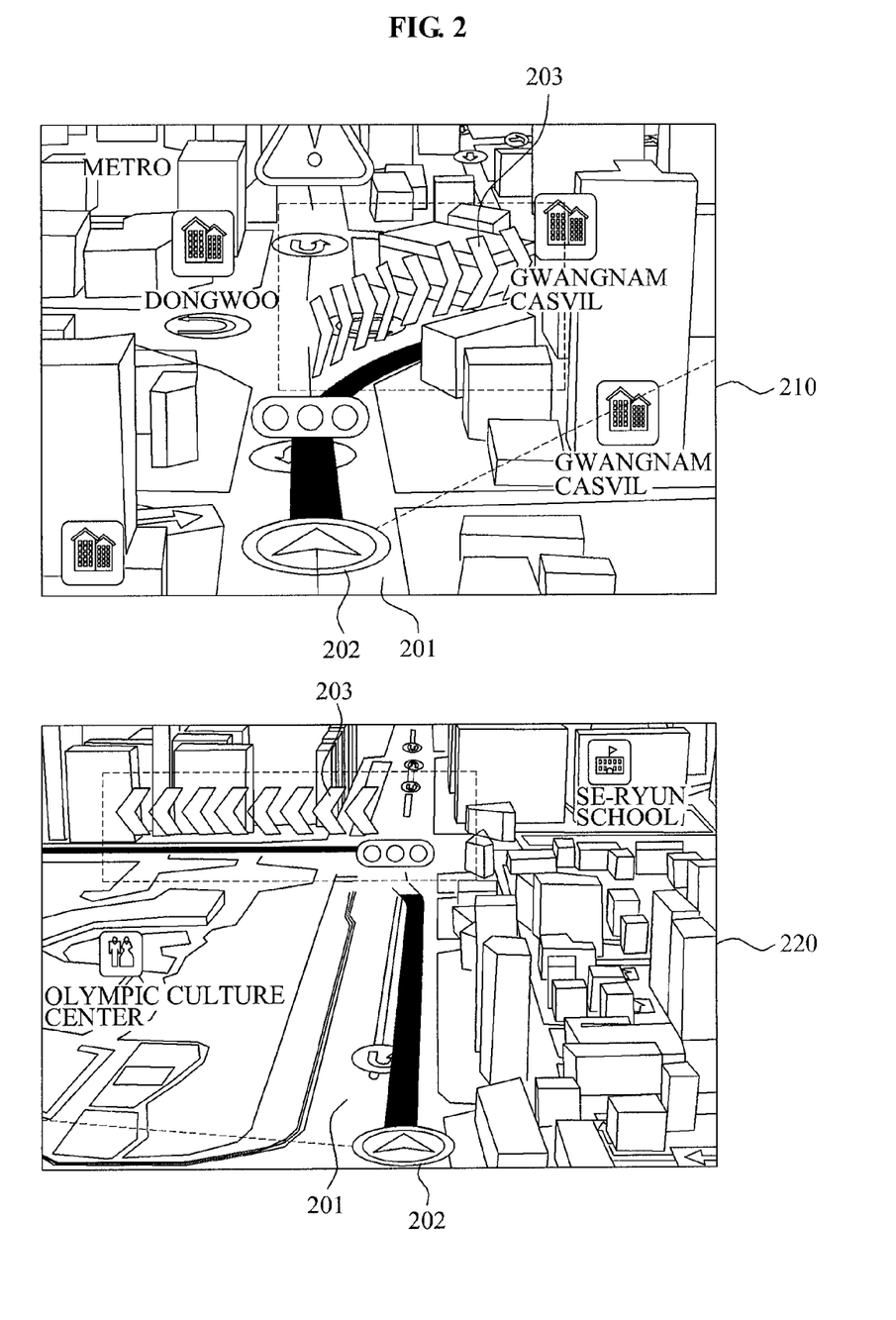
FIG. 2 illustrates an example of expressing a curved path in a 3D direction display generation apparatus according to an embodiment of the present invention.

FIG. 2 illustrates an example of expressing a curved path in the 3D direction display generation apparatus 100 according to an embodiment of the present invention.

When a turn section is included in a path 202 displayed on a 3D map 201 where buildings around a road is three-dimensionally expressed, the direction display generation unit 103 may display a 3D direction display 203 above the turn section.

As shown in a view 210, when a vehicle is away from the turn section by greater than a predetermined distance, the direction display generation unit 210 may not display a path of the turn section in detail and thus the 3D direction display 203 may be displayed into a turn direction of the path.

Also, as shown in a view 220, when the vehicle approaches the turn section, a curved angle of the path in the turn section may be displayed in detail. Accordingly, the direction display generation unit 103 may display the 3D direction display 203 that is curved at the same curved degree of the path.

The direction display generation unit 103 may display the 3D direction display 203, using a different color, according to the curved angle of the path.

The direction display generation unit 103 may give an animation effect to the 3D direction display 203.

As described above, according to an embodiment of the present invention, it is possible to provide a 3D direction display that that may be recognized from a long distance according to a heading direction and an angle of a path. Therefore, a user may easily recognize information regarding into which direction a vehicle needs to take a turn. Also, the user may easily recognize information regarding how curved a turn section is.

Figure 3:
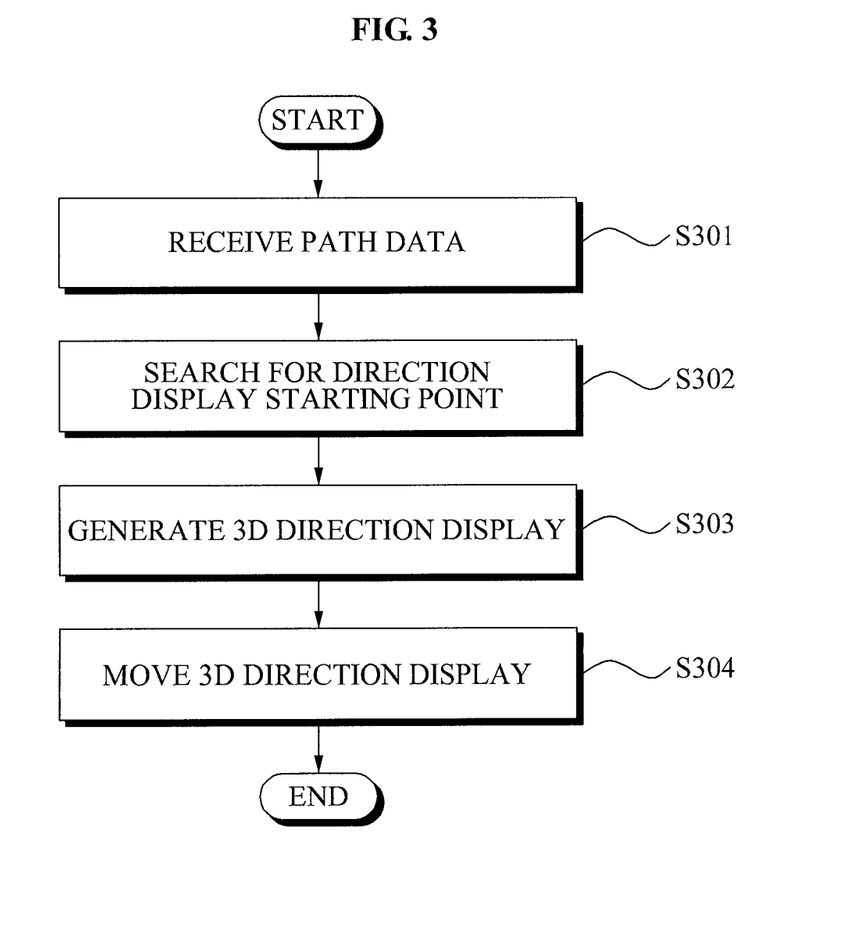
FIG. 3 is a flowchart illustrating a method of generating a 3D direction display according to an embodiment of the present invention.

FIG. 3 is a flowchart illustrating a method of generating a 3D direction display according to an embodiment of the present invention.

In operation S301, the direction display starting point search point 102 may receive path data from the path generation unit 101. In this instance, the received path data may include linear interpolation points.

In operation S302, the direction display starting point search point 102 may search the path data for a direction display starting point. A method of retrieving the direction display starting point will be described in detail later with reference to FIG. 4.

In operation S303, the direction display generation unit 103 may generate an additional interpolation point between the linear interpolation points of the received path data, and may generate a 3D direction display using the direction display starting point and the additional interpolation point. A method of generating the 3D direction display using the direction display starting point and the additional interpolation point will be described in detail later with reference to FIG. 6.

The direction display generation unit 103 may generate, using a different color, the 3D direction display in correspondence to a number of linear interpolation points that are included between the direction display starting point and the additional interpolation point, or between a plurality of additional interpolation points, when the plurality of additional interpolation points are generated.

The direction display generation unit 103 may generate the 3D direction display to have the same direction vector as a direction vector of the path data.

In operation S304, the direction display movement unit 104 may move the generated 3D direction display to be discerned from the path. In this instance, the direction display movement unit 104 may move the 3D direction display towards a direction vector direction between a location of a vehicle and the direction display starting point.

The method of generating the 3D direction display will be further described in detail with reference to FIGS. 4 through 8.

Figure 4:
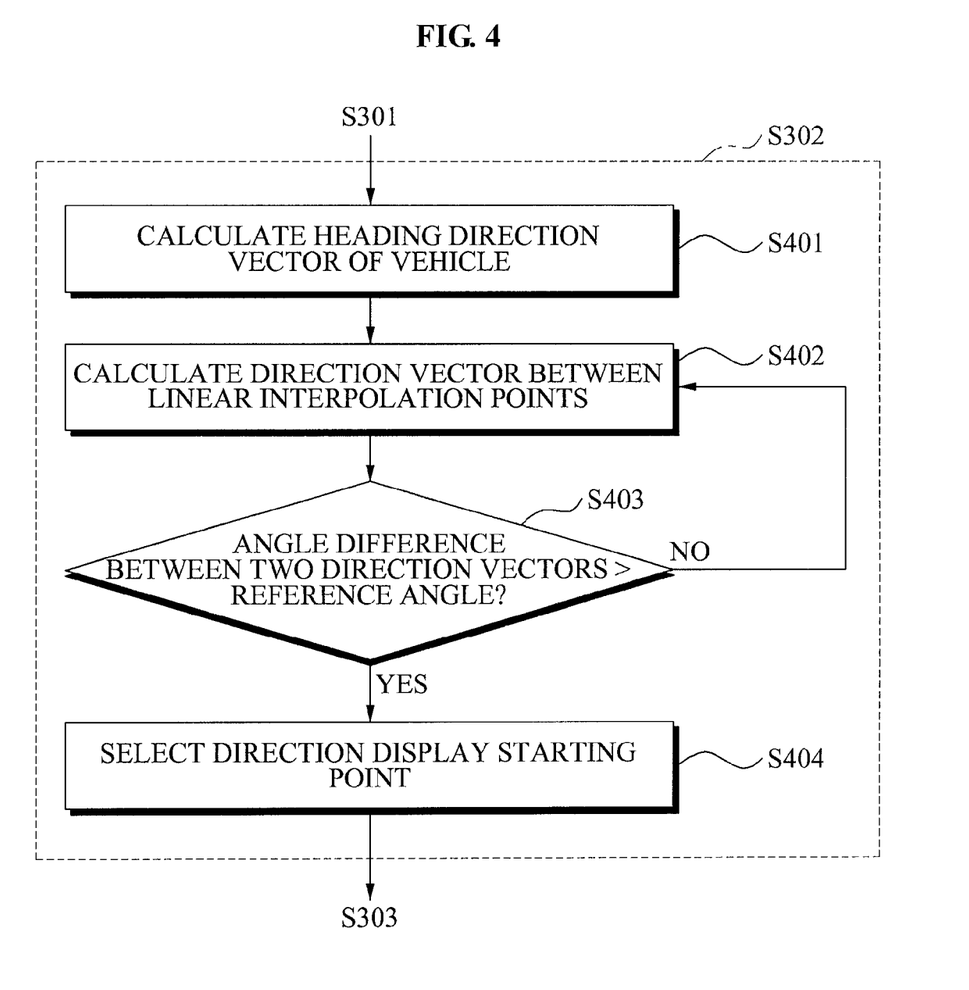
FIG. 4 is a flowchart illustrating an operation of searching path data for a direction display starting point shown in FIG. 3.

FIG. 4 is a flowchart illustrating operation S302 of FIG. 3 in detail. Here, operations S401 through S404 may be included in operation S302 and thereby be performed.

In operation S401, the direction display starting point search unit 102 may calculate a heading direction vector of a vehicle from a current location of the vehicle and a guide point. Here, the guide point may denote a point where the path starts.

The heading direction vector $D_c$ of the vehicle may denote a difference between the location of the vehicle $P_{Car}$ and the guide point $P_{G1}$.

In operation S402, the direction display starting point search unit 102 may calculate a direction vector between linear interpolation points constituting the path data, from the guide point and the linear interpolation points.

Here, the direction vector $D_{Gi}$ between the linear interpolation points may denote a difference between a corresponding linear interpolation point $P_{Gi}$ and a subsequent linear interpolation point $P_{Gi+1}$ thereof.

In this instance, i denotes a number that indicates which linear interpolation point from the guide point $P_{G1}$.

In operation S403, the direction display starting point search unit 102 may verify whether an angle difference between the heading direction vector calculated in operation S401 and the direction vector calculated in operation S402 is greater than a reference angle. In this instance, the reference angle may be a threshold of an angle at which the 3D direction display is well displayed.

In this instance, the direction display starting point search unit 102 may set the reference angle to $\pi/4$.

In operation S404, the direction display starting point search unit 102 may select, as the direction display starting point, a linear interpolation point of which the angle difference is greater than the reference angle.

Figure 5:
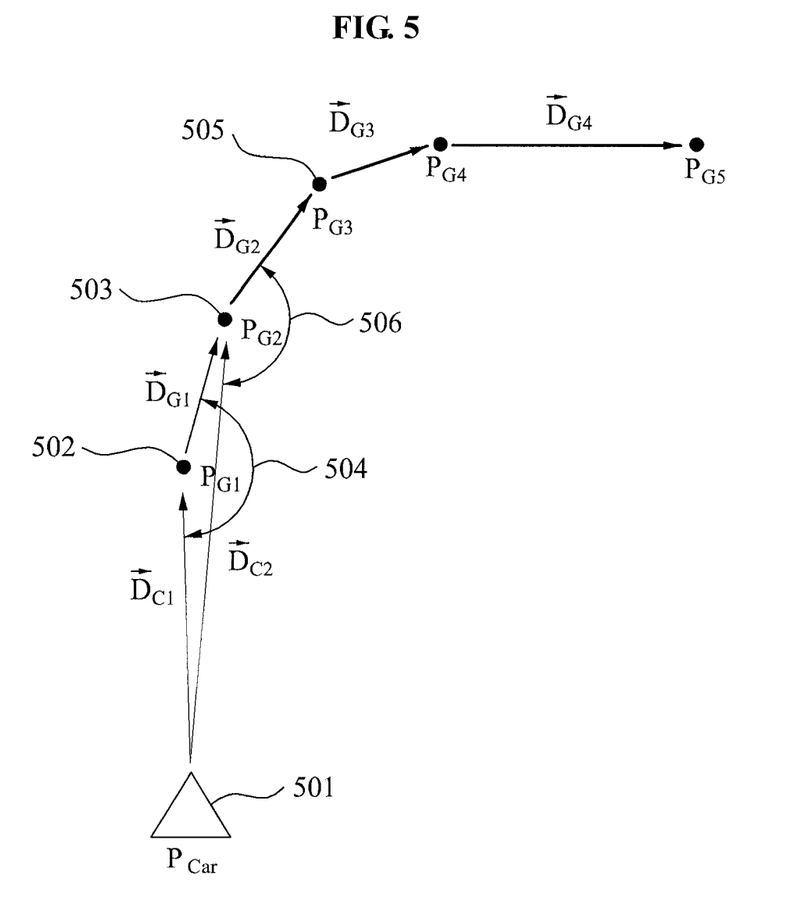
FIG. 5 illustrates an example of path data used for searching path data for a direction display starting point according to an embodiment of the present invention.

FIG. 5 illustrates an example of path data used for searching path data for a direction display starting point according to an embodiment of the present invention.

The direction display starting point search unit 102 may calculate a heading direction vector $D_{C1}$ of a vehicle from a location $P_{Car}$ 501 of the vehicle and a guide point $P_{G1}$ 502. The direction display starting point search unit 102 may calculate an inter-linear interpolation point direction vector $D_{G1}$ of the guide point $P_{G2}$ 502 from the guide point $P_{G1}$ 502 and a linear interpolation point $P_{G2}$ 503. In this instance, when an angle difference 504 between the heading direction vector $D_{C1}$ and the inter-linear interpolation point direction vector $D_{G1}$ is less than a reference angle, the direction display starting point search unit 102 may not set the direction display starting point.

The direction display starting point search unit 102 may calculate a heading direction vector $D_{C2}$ of the vehicle from the location $P_{Car}$ 501 of the vehicle and the linear interpolation point $P_{G2}$ 503, and may calculate an inter-linear interpolation point direction vector $D_{G2}$ of the linear interpolation point $P_{G2}$ 503 from the linear interpolation point $P_{G2}$ 503 and a linear interpolation point $P_{G3}$ 505. In this instance, when an angle difference 506 between the heading direction vector $D_{C2}$ of the vehicle and the inter-linear interpolation point direction vector $D_{G2}$ is greater than the reference angle, the direction display starting point search unit 102 may set the direction display starting point.

Figure 6:
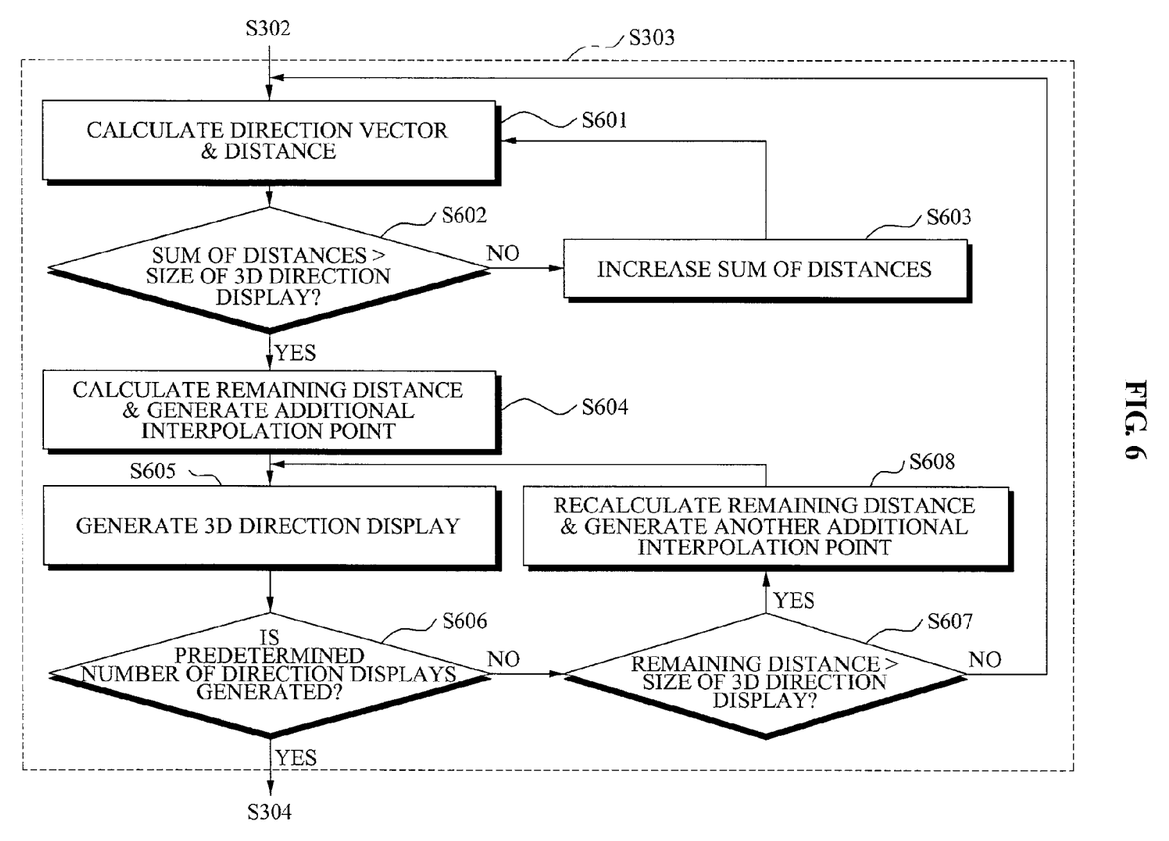
FIG. 6 is a flowchart illustrating an operation of generating a 3D direction display using an additional interpolation point shown in FIG. 3.

FIG. 6 is a flowchart illustrating operation S303 of FIG. 3 in detail. As shown in FIG. 6, operations S601 through S608 may be included in operation S303 of FIG. 3 and thereby be performed.

In operation S601, the direction display generation unit 103 may calculate a direction vector and a distance between linear interpolation points that start from the direction display starting point.

In operation S602, the direction display generation unit 103 may verify whether a sum of distances between the linear interpolation points starting from the direction display starting point is greater than a size of the 3D direction display. In this instance, a minimum sum of distances may be a distance between the direction display starting point and a linear interpolation point that is positioned next to the direction display starting point. Also, the 3D direction display may be in a form of a square that is vertically provided on a path. The size of the 3D direction display may indicate a length of one side of the 3D direction display.

In operation S603, the direction display generation unit 103 may increase the sum of distances. In this instance, the direction display generation unit 103 may add, to the sum of distances, a distance to another linear interpolation point that is not used for the sum of distances.

In operation S604, the direction display generation unit 103 may calculate the remaining distance using a distance difference between the sum of distances and the size of the 3D direction display, and generate the additional interpolation point. In this instance, the direction display generation unit 103 may calculate the remaining distance by subtracting the size of the 3D direction display from the sum of distances used in operation S602, and may generate the additional interpolation point at a location where a movement is made from a last linear interpolation point used for the sum of distances to a previous linear interpolation point of the last linear interpolation point by the remaining distance.

In operation S605, the direction display generation unit 103 may generate the 3D direction display using the linear interpolation point and the additional interpolation point.

In this instance, the direction display generation unit 103 may generate the 3D direction display by using, as a bottom side of the 3D direction display, a line that connects a first linear interpolation of the path data and the additional interpolation point along the path data, by forming vertical lines corresponding to the size of the 3D direction display, at the first linear interpolation point and the additional interpolation point, respectively, and by connecting the vertical lines.

In this instance, the direction display generation unit 103 may indicate, in the 3D direction display, an arrow indicator corresponding to a direction of the direction vector calculated in operation S601.

In operation S606, the direction display generation unit 103 may verify whether a predetermined number of direction displays is generated, and may terminate generating of the 3D direction display when the predetermined number of direction displays is generated. In this instance, the predetermined number of direction displays is at least one that is changeable according to a processing capacity of the 3D direction display generation apparatus.

In operation S607, the direction display generation unit 103 may verify whether the remaining distance is greater than the size of the 3D direction display.

In operation S608, the direction display generation unit 103 may recalculate the remaining distance using a distance difference between the remaining distance and the size of the 3D direction display, and may further generate another additional interpolation point. In this instance, the direction display generation unit 103 may calculate the remaining distance 2 by subtracting the size of the 3D direction display from the remaining distance calculated in operation S604, and generate the other additional interpolation point at a location where a movement is made from a last linear interpolation point used for the sum of distances to a previous linear interpolation point of the last linear interpolation point by the remaining distance 2.

Figure 7:
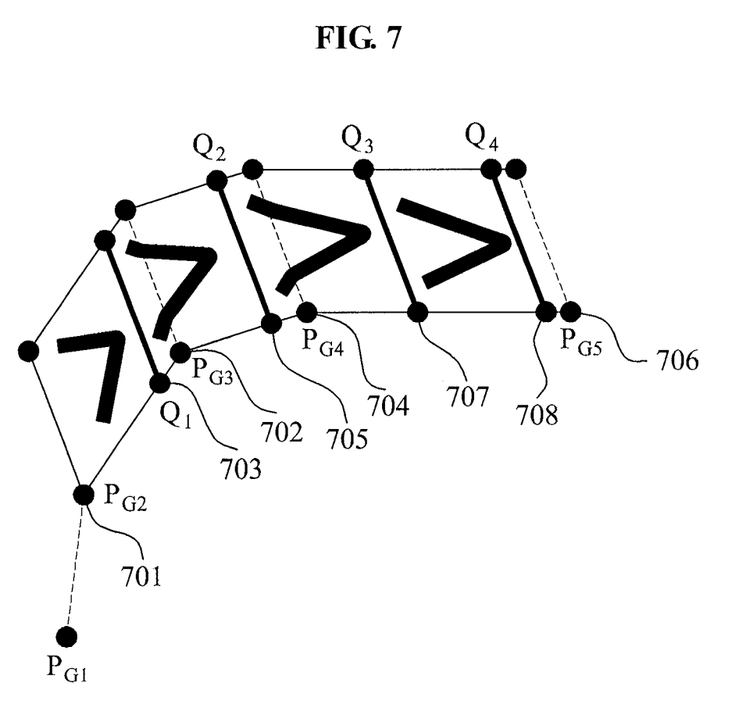
FIG. 7 illustrates an example of path data used for generating a 3D direction display using an additional interpolation point according to an embodiment of the present invention.

FIG. 7 illustrates an example of path data used for generating a 3D direction display using an additional interpolation point according to an embodiment of the present invention.

The direction display generation unit 103 may calculate a distance 1 between a linear interpolation point $P_{G2}$ 701, selected as the direction display starting point in operation S302, and a linear interpolation point $P_{G3}$ 702, to compare the calculated distance 1 with a size of a 3D direction display. When the distance 1 is greater than the size of the 3D direction display, the direction display generation unit 103 may calculate a remaining distance 1 by subtracting the size of the 3D direction display from the distance 1. In this instance, the direction display generation unit 103 may generate an additional interpolation point $Q_1$ 703 at a location where a movement is made from the linear interpolation point $P_{G3}$ 702 to the linear interpolation point $P_{G2}$ 701 by the remaining distance 1, and may generate the 3D direction display based on the linear interpolation point $P_{G2}$ 701 and the additional interpolation point $Q_1$ 703.

The direction display generation unit 103 may calculate a distance 2 between a subsequent linear interpolation point $P_{G4}$ 704 of the linear interpolation point $P_{G3}$ 702 and the additional interpolation point $Q_1$ 703, to compare the calculated distance 2 with the size of the 3D direction display. When the distance 2 is greater than the size of the 3D direction display, the direction display generation unit 103 may calculate a remaining distance 2 by subtracting the size of the 3D direction display from the distance 2. In this instance, the direction display generation unit 103 may generate another additional interpolation point $Q_2$ 705 at a location where a movement is made from the linear interpolation point $P_{G4}$ 704 to the linear interpolation point $P_{G3}$ 702 by the remaining distance 2, and may generate the 3D direction display based on the additional interpolation point $Q_1$ 703 and the other additional interpolation point $Q_2$ 705.

The direction display generation unit 103 may calculate a distance 3 between a subsequent linear interpolation point $P_{G5}$ 706 of the linear interpolation point $P_{G4}$ 704 and the other additional interpolation point $Q_2$ 705, to compare the calculated distance 3 with the size of the 3D direction display. When the distance 3 is greater than the size of the 3D direction display, the direction display generation unit 103 may calculate a remaining distance 3 by subtracting the size of the 3D direction display from the distance 3. In this instance, the direction display generation unit 103 may generate still another additional interpolation point $Q_3$ 707 at a location where a movement is made from the linear interpolation point $P_{G5}$ 706 to the linear interpolation point $P_{G4}$ 704 by the remaining distance 3, and may generate the 3D direction display based on the additional interpolation point $Q_2$ 705 and the additional interpolation point $Q_3$ 707.

The direction display generation unit 103 may compare the remaining distance 3 with the size of the 3D direction display. When the remaining distance 3 is greater than the size of the 3D direction display, the direction display generation unit 103 may calculate a remaining distance 4 by subtracting the size of the 3D direction display from the distance 3. In this instance, the direction display generation unit 103 may generate an additional interpolation point $Q_4$ 708 at a location where a movement is made from the linear interpolation point $P_{G5}$ 706 to the linear interpolation point $P_{G4}$ 704 by the remaining distance 4, and may generate the 3D direction display based on the additional interpolation point $Q_3$ 707 and the additional interpolation point $Q_3$ 708.

Figure 8:
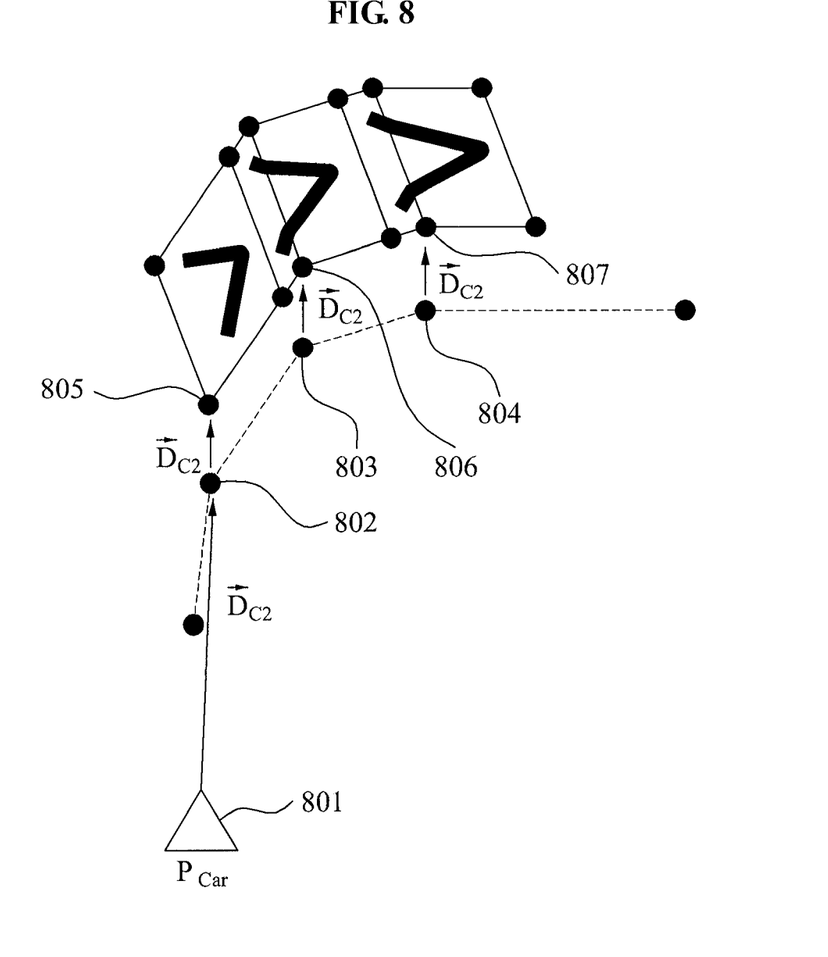
FIG. 8 illustrates an example of path data used for moving a 3D direction display according to an embodiment of the present invention.

FIG. 8 illustrates an example of path data used for moving a 3D direction display according to an embodiment of the present invention.

The direction display generation unit 103 may calculate a direction vector $D_{C2}$ from a location $P_{Car}$ 801 of a vehicle to a direction display starting point 802. In this instance, when the direction display generation unit 103 sets the direction vector $D_{C2}$ as a movement unit vector, and moves the direction display starting point 802 and linear interpolation points 803 and 804 that are included in the 3D direction display generated in operation S303, towards directions 805, 806, and 807 corresponding to the movement unit direction, respectively, the 3D direction display based on the direction display starting point 802 and the linear interpolation points 803 and 804 may also be moved into the directions 805, 806, and 807 corresponding to the movement unit vector.

In this instance, the distance that the direction display generation unit 103 moves the 3D direction display may be changed according to a width of a road. Generally, since a path including linear interpolation points is located in a center of the road, it is possible to separate the 3D direction display from the road by setting the distance to be greater than a half of the width of the road.

As described above, when a 3D direction display is generated according to embodiments of the present invention, the 3D direction display may be displayed to be recognizable even from a long distance according to a heading direction of a path and an angle of the path. Accordingly, even from the long distance, a user may easily recognize information regarding where to turn left or right, and how curved a turn section is.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for generating a three-dimensional (3D) direction display, the apparatus comprising:
a display configured to display a 3D map; and
a controller configured to:
display a predetermined path on the 3D map, and
display a 3D direction display object during displaying the predetermined path for guiding a direction on a specific position of a guide point of the displayed path, the 3D direction display object being positioned above the displayed path;
wherein a starting point of the 3D direction display object is moving on the predetermined path according to a distance between the apparatus and the guide point;
wherein the 3D direction display object includes a plurality of interpolation point objects; and
wherein when a distance between two interpolation point objects of the plurality of interpolation point objects is greater than a size of the 3D direction display, the controller is configured to calculate a remaining distance by subtracting the size of the 3D direction display from the distance and generate an additional interpolation point object at a location on the displayed path between the two interpolation point objects based on the remaining distance.

2. The apparatus of claim 1, wherein the 3D direction display object is changed according to a curved angle of the displayed path on the guide point when the apparatus approaches the guide point.

3. The apparatus of claim 1, wherein each of the interpolation point objects has a predetermined color according to a number of the interpolation point objects or to the curved angle of the displayed path.

4. The apparatus of claim 1, wherein the controller is further configured to provide an animation effect to the 3D direction display object.

5. The apparatus of claim 1, wherein the controller is further configured to display the 3D direction display object as curved form.

6. A method for generating a three-dimensional (3D) direction display, the method comprising:
displaying a 3D map;
displaying a predetermined path on the 3D map;
displaying a 3D direction display object during displaying the predetermined path for guiding a direction on a specific position of a guide point of the displayed path, the 3D direction display object being positioned above the displayed path, wherein the 3D direction display object includes a plurality of interpolation point objects; and
when a distance between two interpolation point objects of the plurality of interpolation point objects is greater than a size of the 3D direction display, calculating a remaining distance by subtractin the size of the 3D direction display from the distance and generating an additional interpolation point object at a location on the displayed path between the two interpolation point objects based on the remaining distance;
wherein a starting point of the 3D direction display object is moving on the path according to a distance between the apparatus and the guide point.

7. The method of claim 6, wherein the 3D direction display object is changed according to a curved angle of the displayed path on the guide point when the apparatus approaches the guide point.

8. The method of claim 6, wherein each of the interpolation point objects has a predetermined color according to a number of the interpolation point objects or to the curved angle of the displayed path.

9. The method of claim 6, wherein the displaying step further includes providing an animation effect to the 3D direction display object.

10. The method of claim 6, wherein the displaying step further includes displaying the 3D direction display object as curved form.

* * * * *